(12) United States Patent
Hodono

(10) Patent No.: US 8,548,285 B2
(45) Date of Patent: *Oct. 1, 2013

(54) MANUFACTURING METHOD OF OPTICAL SENSOR MODULE AND OPTICAL SENSOR MODULE OBTAINED THEREBY

(75) Inventor: Masayuki Hodono, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 349 days.

This patent is subject to a terminal disclaimer.

(21) Appl. No.: 12/847,121

(22) Filed: Jul. 30, 2010

(65) Prior Publication Data

US 2011/0026873 A1 Feb. 3, 2011

Related U.S. Application Data

(60) Provisional application No. 61/233,288, filed on Aug. 12, 2009.

(30) Foreign Application Priority Data

Aug. 3, 2009 (JP) ................................. 2009-180723

(51) Int. Cl.
*G02B 6/12* (2006.01)
*G02B 6/10* (2006.01)
(52) U.S. Cl.
USPC ................ 385/14; 385/52; 385/129; 385/130
(58) Field of Classification Search
None
See application file for complete search history.

(56) References Cited

U.S. PATENT DOCUMENTS

| | | | |
|---|---|---|---|
| 5,222,175 A | 6/1993 | Tatoh | |
| 5,265,184 A * | 11/1993 | Lebby et al. | 385/132 |
| 5,319,725 A | 6/1994 | Buchmann et al. | |
| 5,359,686 A | 10/1994 | Galloway et al. | |
| 5,428,704 A * | 6/1995 | Lebby et al. | 385/92 |
| 5,446,814 A * | 8/1995 | Kuo et al. | 385/31 |
| 5,521,992 A | 5/1996 | Chun et al. | |
| 5,780,875 A | 7/1998 | Tsuji et al. | |

(Continued)

FOREIGN PATENT DOCUMENTS

| | | |
|---|---|---|
| CN | 101002123 A | 7/2007 |
| CN | 101014889 A | 8/2007 |

(Continued)

OTHER PUBLICATIONS

European Search Report dated Jul. 13, 2010, issued in related European Patent Application No. 10159096.

(Continued)

*Primary Examiner* — Michelle R Connelly
(74) *Attorney, Agent, or Firm* — Westerman, Hattori, Daniels & Adrian, LLP

(57) ABSTRACT

A method of manufacturing an optical sensor module which eliminates the need for the operation of alignment between a core in an optical waveguide section and an optical element in a substrate section, and an optical sensor module obtained thereby. An optical waveguide section $W_1$ including groove portions (fitting portions) 4a for the positioning of a substrate section, and a substrate section $E_1$ including fitting plate portions (to-be-fitted portions) 5a for fitting engagement with the groove portions 4a are individually produced. The fitting plate portions 5a in the substrate section $E_1$ are brought into fitting engagement with the groove portions 4a in the optical waveguide section $W_1$ whereby the substrate section $E_1$ and the optical waveguide section $W_1$ are integrated together.

4 Claims, 11 Drawing Sheets

(56) References Cited

U.S. PATENT DOCUMENTS

| | | | |
|---|---|---|---|
| 5,835,646 A * | 11/1998 | Yoshimura et al. | 385/14 |
| 5,905,831 A | 5/1999 | Boudreau et al. | |
| 5,909,523 A | 6/1999 | Sakaino et al. | |
| 6,042,276 A | 3/2000 | Tachigori | |
| 6,088,498 A * | 7/2000 | Hibbs-Brenner et al. | 385/52 |
| 6,456,766 B1 * | 9/2002 | Shaw et al. | 385/47 |
| 6,541,762 B2 * | 4/2003 | Kang et al. | 250/239 |
| 6,912,333 B2 | 6/2005 | Mikawa et al. | |
| 6,917,056 B2 | 7/2005 | Dautartas et al. | |
| 7,063,467 B2 | 6/2006 | Nagasaka et al. | |
| 7,146,080 B2 * | 12/2006 | Neta et al. | 385/40 |
| 7,150,569 B2 * | 12/2006 | Oono et al. | 385/88 |
| 7,184,630 B2 | 2/2007 | Kwon et al. | |
| 7,310,457 B2 | 12/2007 | Kotake | |
| 7,313,293 B2 | 12/2007 | Murashima et al. | |
| 7,317,861 B2 * | 1/2008 | Ohtsu et al. | 385/132 |
| 7,333,682 B2 * | 2/2008 | Kobayashi et al. | 385/14 |
| 7,373,033 B2 | 5/2008 | Lu et al. | |
| 7,668,414 B2 | 2/2010 | Shemi et al. | |
| 7,724,988 B2 | 5/2010 | Dellmann et al. | |
| 7,898,736 B2 * | 3/2011 | Jacobowitz et al. | 359/619 |
| 8,014,638 B2 * | 9/2011 | Nakano et al. | 385/14 |
| 2002/0076161 A1 * | 6/2002 | Hirabayashi et al. | 385/40 |
| 2003/0219208 A1 | 11/2003 | Kwon et al. | |
| 2004/0001661 A1 * | 1/2004 | Iwaki et al. | 385/14 |
| 2004/0190831 A1 * | 9/2004 | Lu et al. | 385/49 |
| 2004/0234210 A1 | 11/2004 | Nagasaka et al. | |
| 2005/0100264 A1 * | 5/2005 | Kim et al. | 385/14 |
| 2005/0185892 A1 | 8/2005 | Kwon et al. | |
| 2005/0201667 A1 | 9/2005 | Neta et al. | |
| 2005/0207718 A1 | 9/2005 | Komura et al. | |
| 2006/0045410 A1 | 3/2006 | Trott et al. | |
| 2006/0093259 A1 | 5/2006 | Oggioni | |
| 2007/0127865 A1 | 6/2007 | Lu et al. | |
| 2007/0297713 A1 | 12/2007 | Lu et al. | |
| 2008/0037927 A1 | 2/2008 | Kurihara et al. | |
| 2009/0016670 A1 | 1/2009 | Shemi et al. | |
| 2009/0116799 A1 | 5/2009 | Hodono | |
| 2009/0279827 A1 | 11/2009 | Sano et al. | |
| 2009/0285580 A1 | 11/2009 | Yasuda et al. | |
| 2010/0254666 A1 | 10/2010 | Hodono | |
| 2011/0026873 A1 | 2/2011 | Hodono | |
| 2011/0085758 A1 | 4/2011 | Hodono | |
| 2011/0135250 A1 | 6/2011 | Hodono | |
| 2011/0216995 A1 | 9/2011 | Hodono | |
| 2012/0027338 A1 | 2/2012 | Hodono | |
| 2012/0051684 A1 | 3/2012 | Hodono | |
| 2012/0201490 A1 | 8/2012 | Naito et al. | |

FOREIGN PATENT DOCUMENTS

| | | |
|---|---|---|
| CN | 101430401 A | 5/2009 |
| CN | 101859006 A | 10/2012 |
| EP | 0548440 A1 | 6/1993 |
| JP | 5-196831 A | 8/1993 |
| JP | 2004-302345 A | 10/2004 |
| JP | 2008-102283 A | 5/2008 |
| JP | 2009180723 A | 8/2009 |
| JP | 2011-033876 A | 2/2011 |
| JP | 2011-102955 | 5/2011 |
| WO | 2004/015463 A1 | 2/2004 |
| WO | 2009/001969 A2 | 12/2008 |

OTHER PUBLICATIONS

Japanese Patent Application of 2009-180723, filing date Aug. 3, 2009 (cited in Specification of co-pending related U.S. Appl. No. 12/900,647).

U.S. Office Action dated Apr. 27, 2011, issued in related U.S. Appl. No. 13/020,936.

U.S. Notice of Allowance dated Oct. 2, 2012, issued in related U.S. Appl. No. 13/211,096.

U.S. Notice of Allowance dated Oct. 1, 2012, issued in related U.S. Appl. No. 13/184,865.

U.S. Office Action dated Sep. 26, 2012, issued in related U.S. Appl. No. 13/361,230.

U.S. Notice of Allowance dated Oct. 25, 2012, issued in related U.S. Appl. No. 12/900,964.

U.S. Notice of Allowance dated Aug. 25, 2011, issued in related U.S. Appl. No. 13/020,936.

U.S. Notice of Allowance dated Jan. 4, 2013, issued in corresponding U.S. Appl. No. 13/040,849.

Second Chinese Office Action dated Mar. 25, 2013, issued in corresponding Chinese Patent Application No. 201010244781.0 (16 pages).

Chinese Office Action dated Aug. 22, 2012, issued in corresponding Chinese Patent Application No. 201010244781.0, w/English Translation.

* cited by examiner

US 8,548,285 B2

MANUFACTURING METHOD OF OPTICAL SENSOR MODULE AND OPTICAL SENSOR MODULE OBTAINED THEREBY

RELATED APPLICATIONS

This application claims the benefit of U.S. Provisional Application No. 61/233,288, filed Aug. 12, 2009, which is hereby incorporated by reference.

BACKGROUND OF THE INVENTION

1. Field of the Invention

The present invention relates to a method of manufacturing an optical sensor module including an optical waveguide section and a substrate section with an optical element mounted therein, and to an optical sensor module obtained thereby.

2. Description of the Related Art

As shown in FIGS. 13A and 13B, an optical sensor module is manufactured by: individually producing an optical waveguide section $W_0$ in which an under cladding layer 71, a core 72 and an over cladding layer 73 are disposed in the order named, a substrate section $E_0$ in which an optical element 82 is mounted on a substrate 81; and then connecting the above-mentioned substrate section $E_0$ to an end portion of the above-mentioned optical waveguide section $W_0$, with the core 72 of the above-mentioned optical waveguide section $W_0$ and the optical element 82 of the substrate section $E_0$ kept in alignment with each other. In FIGS. 13A and 13B, the reference numeral 74 designates an adhesive layer, 75 designates a base, 83 designates an insulation layer, 84 designates an optical element mounting pad, and 85 designates a transparent resin layer.

The above-mentioned alignment between the core 72 of the above-mentioned optical waveguide section $W_0$ and the optical element 82 of the substrate section $E_0$ is generally performed by using a self-aligning machine (see, for example, Japanese Published Patent Application No. 5-196831). In this self-aligning machine, the alignment is performed with the optical waveguide section $W_0$ fixed on a fixed stage (not shown) and the substrate section $E_0$ fixed on a movable stage (not shown). Specifically, when the above-mentioned optical element 82 is a light-emitting element, the alignment is as follows. As shown in FIG. 13A, while the position of the light-emitting element is changed relative to a first end surface (light entrance) 72a of the core 72, with light $H_1$ emitted from the light-emitting element, the amount of light emitted outwardly from a second end surface (light exit) 72b of the core 72 through a lens portion 73b provided in a second end portion of the over cladding layer 73 (the photovoltaic voltage developed across a light-receiving element 91 provided in the self-aligning machine) is monitored. Then, the position in which the amount of light is maximum is determined as an alignment position (a position in which the core 72 and the optical element 82 are appropriate relative to each other). On the other hand, when the above-mentioned optical element 82 is a light-receiving element, the alignment is as follows. As shown in FIG. 13B, the second end surface 72b of the core 72 receives a constant amount of light (light emitted from a light-emitting element 92 provided in the self-aligning machine and transmitted through the lens portion 73b provided in the first end portion of the over cladding layer 73) $H_2$. While the position of the light-receiving element is changed relative to the first end surface 72a of the core 72, with the light $H_2$ emitted outwardly from the first end surface 72a of the core 72 through a second end portion 73a of the over cladding layer 73, the amount of light received by the light-receiving element (the photovoltaic voltage) is monitored. Then, the position in which the amount of light is maximum is determined as the alignment position.

However, while the alignment using the above-mentioned self-aligning machine can be high-precision alignment, it requires labor and time and therefore unsuited for mass production.

DISCLOSURE OF THE INVENTION

In view of the foregoing, it is an object of the present invention to provide a method of manufacturing an optical sensor module which eliminates the need for the operation of alignment between a core in an optical waveguide section and an optical element in a substrate section, and an optical sensor module obtained thereby.

The present inventor has made studies of a method capable of achieving alignment without equipment and labor as mentioned above. As a result, the present inventor has hit upon the idea of a simple method in which a fitting portion is formed in a predetermined position of an over cladding layer in an optical waveguide section during the formation of the over cladding layer by die-molding whereas a to-be-fitted portion is formed in a predetermined position of a substrate section, and in which the above-mentioned optical waveguide section and the above-mentioned substrate section are coupled together to form an optical sensor module by fitting engagement between the above-mentioned fitting portion and the to-be-fitted portion. Thus, the present inventor has completed the present invention.

To accomplish the above-mentioned object, a first aspect of the present invention is intended for a method of manufacturing an optical sensor module including an optical waveguide section, and a substrate section with an optical element mounted therein, wherein said optical waveguide section is produced by forming a linear core for an optical path on a surface of an under cladding layer, and then forming fitting portions for the positioning of the substrate section in a portion of an over cladding layer lying in an appropriate position relative to an end portion of said core at the same time as forming the over cladding layer for covering said core by a die-molding process, wherein said substrate section is produced by placing an optical element mounting pad on a substrate, forming to-be-fitted port ions for fitting engagement with the fitting portions for the positioning of said substrate section in an appropriate position of the substrate relative to the optical element mounting pad, and mounting the optical element on said optical element mounting pad, and wherein said optical waveguide section and said substrate section are coupled together to form the optical sensor module by bringing said to-be-fitted portions in said substrate section into fitting engagement with said fitting portions in said optical waveguide section to integrate said optical waveguide section and said substrate section together.

A second aspect of the present invention is intended for an optical sensor module comprising: an optical waveguide section; and a substrate section with an optical element mounted therein, said optical waveguide section and said substrate section being coupled to each other, said optical waveguide section including an under cladding layer, a linear core for an optical path and formed on a surface of the under cladding layer, an over cladding layer for covering the core, and fitting portions for the positioning of the substrate section and formed in a predetermined portion of the over cladding layer, said substrate section including a substrate having to-be-fitted portions for fitting engagement with the fitting portions for the positioning of the substrate section, an optical element mounting pad placed in a predetermined portion on the substrate, and the optical element mounted on the optical element mounting pad, the coupling between said optical waveguide section and said substrate section being provided, with said to-be-fitted port ions in said substrate section held in fitting engagement with said fitting portions in said optical waveguide section.

In the step of producing the optical waveguide section in the method of manufacturing the optical sensor module according to the present invention, the fitting portions for the positioning of the substrate section are formed in a portion of the over cladding layer lying in an appropriate position relative to an end portion of the core at the same time as the over cladding layer during a die-molding process. In the produced optical waveguide section, the end portion of the core and the fitting portions for the positioning of the substrate section are placed in an appropriate positional relationship by such a die-molding process. In the step of producing the substrate section, on the other hand, the to-be-fitted portions for fitting engagement with the fitting portions for the positioning of the above-mentioned substrate section are formed in an appropriate position relative to the optical element mounting pad, and the optical element is mounted on the above-mentioned optical element mounting pad. In the substrate section produced in this manner, the optical element and the to-be-fitted portions are placed in an appropriate positional relationship. In the step of coupling the above-mentioned optical waveguide section and the above-mentioned substrate section together to form the optical sensor module, the above-mentioned to-be-fitted portions in the above-mentioned substrate section are brought into fitting engagement with the above-mentioned fitting portions in the above-mentioned optical waveguide section, whereby the above-mentioned optical waveguide section and the above-mentioned substrate section are integrated together. That is, in this step, the fitting portions placed in the appropriate positional relationship with the end portion of the core and the to-be-fitted portions placed in the appropriate positional relationship with the optical element are brought into fitting engagement with each other. Thus, the end portion of the core and the optical element are placed in an appropriate positional relationship in the manufactured optical sensor module. The method of manufacturing the optical sensor module according to the present invention enables the core of the optical waveguide section and the optical element of the substrate section to be automatically kept in alignment with each other without the operation of alignment therebetween. The method eliminates the need for the operation of alignment that requires time, to thereby achieve the mass production of such optical sensor modules.

In particular, when the above-mentioned fitting portions in the above-mentioned optical waveguide section are in the form of groove portions and the above-mentioned to-be-fitted portions in the above-mentioned substrate section are in the form of plate portions for fitting engagement with the above-mentioned groove portions, the method provides excellent productivity because the fitting engagement between the groove portions and the plate portions is easy.

Also, when the above-mentioned fitting portions in the above-mentioned optical waveguide section are in the form of protruding portions and the above-mentioned to-be-fitted portions in the above-mentioned substrate section are in the form of through hole portions for fitting engagement with the above-mentioned protruding portions, the method provides excellent precision of alignment between the core and the optical element because the central axis of each of the protruding portions is fixed even if the protruding portions thermally or otherwise contract or expand.

Since the optical sensor module according to the present invention is obtained by the above-mentioned manufacturing method, the end portion of the core of the optical waveguide section and the optical element of the substrate section are positioned by the fitting engagement between the fitting portions in the optical waveguide section and the to-be-fitted portions in the substrate section. Thus, if impacts, vibrations and the like are applied to the optical sensor module according to the present invention, the end portion of the above-mentioned core and the optical element do not move out of their positional relationship but are kept in appropriate alignment with each other.

In particular, when the above-mentioned fitting portions in the above-mentioned optical waveguide section are in the form of groove portions and the above-mentioned to-be-fitted portions in the above-mentioned substrate section are in the form of plate portions for fitting engagement with the above-mentioned groove portions, the simple fitting engagement structure provides tight fitting engagement.

Also, when the above-mentioned fitting portions in the above-mentioned optical waveguide section are in the form of protruding portions and the above-mentioned to-be-fitted portions in the above-mentioned substrate section are in the form of through hole portions for fitting engagement with the above-mentioned protruding portions, the optical sensor module maintains a high degree of precision of alignment between the core and the optical element because the central axis of each of the protruding portions is fixed even if the protruding portions thermally or otherwise contract or expand.

DETAILED DESCRIPTION OF THE INVENTION

Next, embodiments according to the present invention will now be described in detail with reference to the drawings.

Figure 1A:
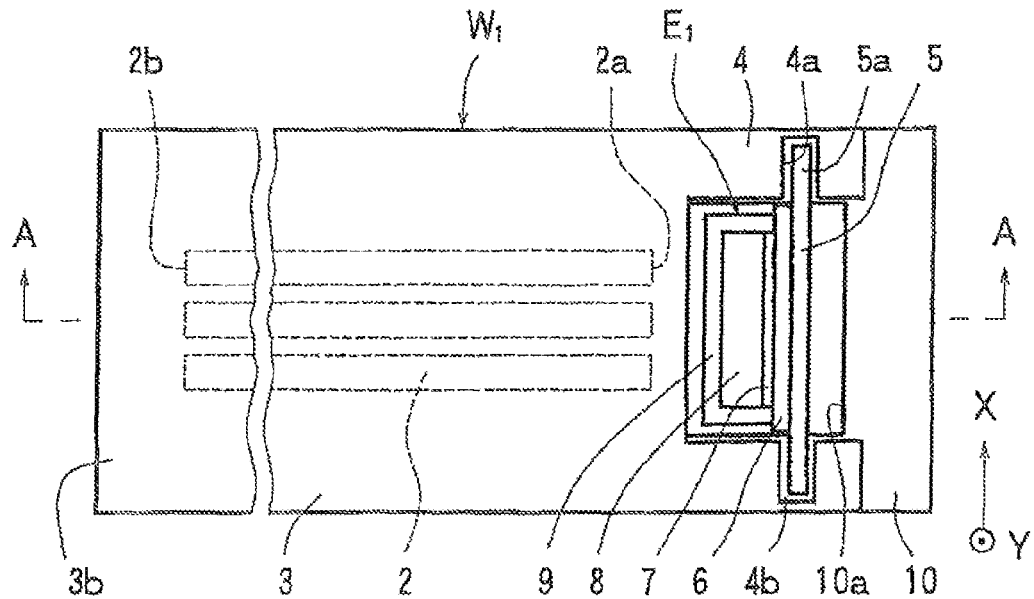
FIG. 1A is a plan view schematically showing an optical sensor module according to a first preferred embodiment of the present invention.
Figure 1B:
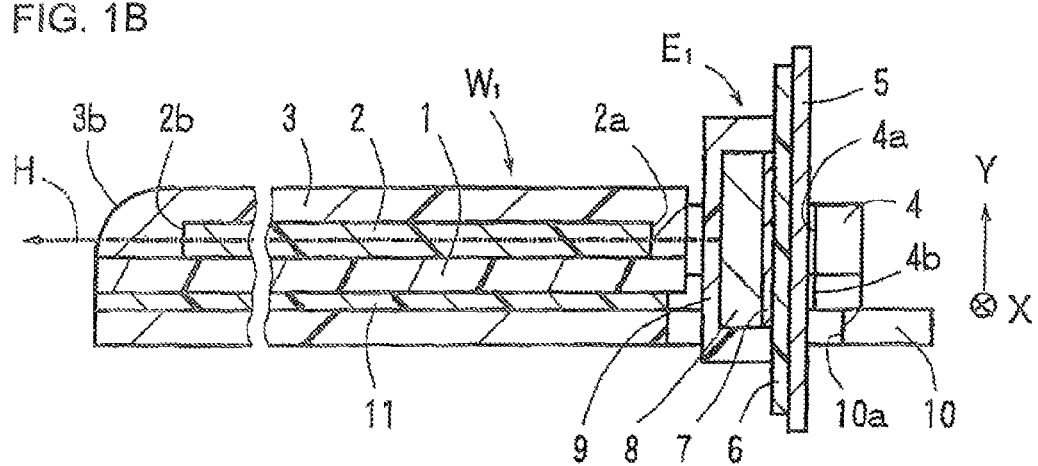
FIG. 1B is a sectional view taken along the line A-A of FIG. 1A.
Figure 2:
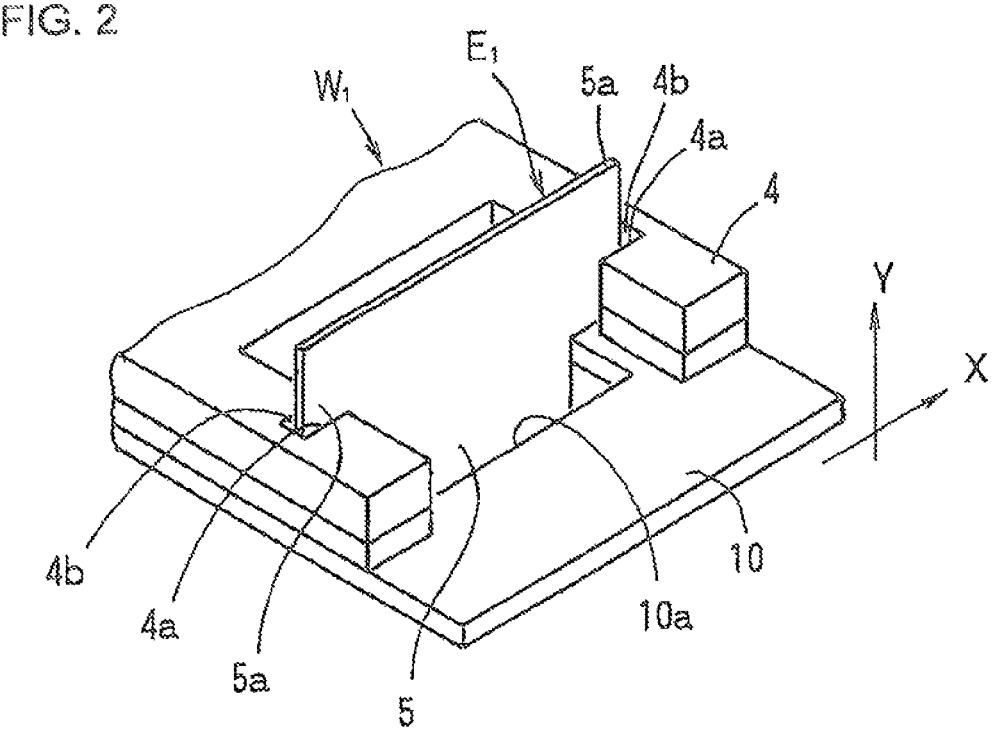
FIG. 2 is a perspective view schematically showing one end portion of the above-mentioned optical sensor module.

FIG. 1A is a plan view schematically showing an optical sensor module according to a first embodiment of the present invention, and FIG. 1B is a sectional view taken along the line A-A of FIG. 1A. FIG. 2 is a perspective view showing a first end portion (the right-hand end portion as seen in FIGS. 1A and 1B) of the optical sensor module as seen diagonally from the upper right. This optical sensor module is constructed by: individually producing an optical waveguide section $W_1$ including groove portions (fitting portions) 4a for the positioning of a substrate section, and a substrate section $E_1$ including fitting plate portions (to-be-fitted portions) 5a for fitting engagement with the groove portions 4a; and then bringing the above-mentioned fitting plate portions 5a in the substrate section $E_1$ into fitting engagement with the above-mentioned groove portions 4a in the above-mentioned optical waveguide section $W_1$ to integrate the substrate section $E_1$ and the optical waveguide section $W_1$ together. In the optical waveguide section $W_1$, the above-mentioned groove portions 4a are formed in an appropriate position relative to first end surfaces 2a of respective cores 2. An optical element is mounted in the substrate section $E_1$, and the above-mentioned fitting plate portions 5a having an appropriate shape are formed in an appropriate position relative to the optical element 8. Thus, the first end surfaces 2a of the respective cores 2 and the optical element 8 are appropriately positioned and in alignment with each other by the fitting engagement between the above-mentioned groove portions 4a and the fitting plate portions 5a. The above-mentioned optical waveguide section $W_1$ is bonded onto a base 10 that is an acrylic board or the like with an adhesive layer 11 therebetween. In FIGS. 1A, 1B and 2, clearance 4b is shown as created between the groove portions 4a of the optical waveguide section $W_1$ and the fitting plate portions 5a of the substrate section $E_1$ for the sake of easier understanding of the figures. In reality, however, there is little clearance 4b therebetween. In FIGS. 1A, 1B and 2, the reference numeral 1 designates an under cladding layer, 3 designates an over cladding layer, 3b designates a lens portion, 4 designates extensions, 5 designates a shaping substrate, 6 designates an insulation layer, 7 designates an optical element mounting pad, 9 designates a transparent resin layer, the reference character 10a designates a through hole, and 11 designates the adhesive layer.

More specifically, the above-mentioned optical waveguide section $W_1$ includes the under cladding layer 1, the cores 2 for an optical path formed linearly in a predetermined pattern on a surface of this under cladding layer 1, and the over cladding layer 3 formed on the surface of the above-mentioned under cladding layer 1 so as to cover the cores 2. A first end portion (on the right-hand side as seen in FIG. 1A) of the optical waveguide section $W_1$ includes upper and lower portions as seen in FIG. 1A extended axially. That is, these extensions 4 are those of the under cladding layer 1 and the over cladding layer 3 where the cores 2 are absent. As shown in FIG. 2, the pair of groove portions 4a for the positioning of the substrate section $E_1$ are formed in the extensions 4, respectively, with the openings of the respective groove portions 4a in face-to-face relation with each other. The groove portions 4a are in the form of a kind of notch extending across the thickness of the under cladding layer 1 and the over cladding layer 3. In this embodiment, the second end portion [the left-hand end portion as seen in FIGS. 1(a) and (b)] of the over cladding layer 3 is formed as the substantially quadrantal lens portion 3b having an outwardly bulging surface.

Figure 3:
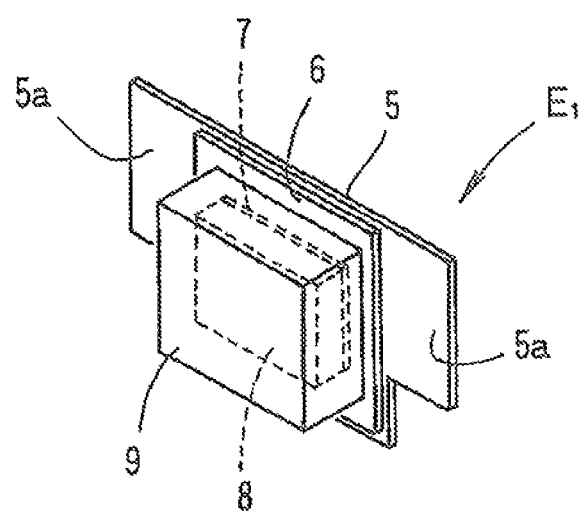
FIG. 3 is a perspective view schematically showing a substrate section of the above-mentioned optical sensor module.

On the other hand, the above-mentioned substrate section $E_1$ includes the shaping substrate 5, the insulation layer 6, the optical element mounting pad 7, the optical element 8, and the transparent resin layer 9, as shown in perspective in FIG. 3. The above-mentioned shaping substrate 5 is formed with the fitting plate portions 5a protruding both leftwardly and rightwardly in cross direction as seen in the Figure for fitting engagement with the above-mentioned groove portions 4a. The above-mentioned insulation layer 6 is formed on the surface of the above-mentioned shaping substrate 5 except where the fitting plate portions 5a are formed. The above-mentioned optical element mounting pad 7 is formed on a central portion of the surface of the above-mentioned insulation layer 6. The above-mentioned optical element 8 is mounted on the optical element mounting pad 7. The above-mentioned transparent resin layer 9 is formed so as to seal the above-mentioned optical element 8. The rectangular fitting plate portions 5a included in the above-mentioned shaping substrate 5 and protruding leftwardly and rightwardly in cross direction as seen in the Figure are formed by etching, and are appropriately positioned and shaped relative to the above-mentioned optical element mounting pad 7. The above-mentioned optical element 8 includes a light-emitting portion or a light-receiving portion formed on the surface of the optical element 8. An electric circuit (not shown) for connection to the optical element mounting pad 7 is formed on the surface of the above-mentioned insulation layer 6.

As shown in FIGS. 1A, 1B and 2, the above-mentioned optical sensor module is configured such that the optical waveguide section $W_1$ and the substrate section $E_1$ are integrated together by bringing the fitting plate portions 5a in the above-mentioned substrate section $E_1$ into fitting engagement with the groove portions 4a in the above-mentioned optical waveguide section $W_1$ which are provided for the positioning of the substrate section. The surface (the light-emitting portion or the light-receiving portion) of the above-mentioned optical element 8 is opposed to the first end surfaces 2a of the respective cores 2 so as to be able to send or receive light. With this fitting engagement held, the above-mentioned optical element 8 is appropriately positioned in a vertical direction (along the X-axis) as seen in FIG. 1A relative to the above-mentioned base 10 by the fitting engagement of the above-mentioned fitting plate portions 5a with the above-mentioned groove portions 4a. With the above-mentioned fitting engagement held, the lower edges of the above-mentioned fitting plate portions 5a protruding leftwardly and rightwardly in cross direction as seen in the Figure are in abutment with the surface of the base 10, as shown in FIG. 2. This allows the appropriate positioning of the above-mentioned optical element 8 in a direction perpendicular to the surface of the base 10 (along the Y-axis). That is, the first end surfaces 2a of the cores 2 and the optical element 8 are placed in an appropriate positional relationship and automatically kept in alignment with each other by the above-mentioned fitting engagement, as shown in FIG. 2.

In this embodiment, the rectangular through hole 10a is formed in a portion of the base 10 corresponding to the above-mentioned substrate section $E_1$, as shown in FIGS. 1A and 2, so that a portion of the substrate section $E_1$ protrudes from the back surface of the above-mentioned base 10, as shown in FIG. 1B. The protruding portion of the substrate section $E_1$ is connected on the back side of the base 10 to, for example, a motherboard (not shown) and the like for the sending and the like of a signal to the optical element 8.

In the above-mentioned optical sensor module, a light beam H is propagated in a manner to be described below. Specifically, when the above-mentioned optical element 8 is, for example, a light-emitting element, the light beam H emitted from the light-emitting portion of the optical element 8 passes through the transparent resin layer 9 and through the over cladding layer 3, and thereafter enters each core 2 through the first end surface 2a of each core 2. Then, the light beam H travels through the interior of each core 2 in an axial direction. Then, the light beam H exits from a second end surface 2b of each core 2. Thereafter, the light beam H exits from the lens surface of the lens portion 3b provided in the second end portion of the over cladding layer 3, with the divergence of the light beam H restrained by refraction through the lens portion 3b.

On the other hand, when the above-mentioned optical element 8 is a light-receiving element, a light beam travels in a direction opposite from that described above, although not shown. Specifically, the light beam enters the lens surface of the lens portion 3b provided in the second end portion of the over cladding layer 3, and enters each core 2 through the second end surface 2b of each core 2, while being narrowed down and converged by refraction through the lens portion 3b. Then, the light beam travels through the interior of each core 2 in an axial direction. The light beam passes through and exits from the over cladding layer 3, then passes through the transparent resin layer 9, and is received by the light-receiving portion of the above-mentioned optical element 8.

The above-mentioned optical sensor module is manufactured by undergoing the process steps (1) to (3) to be described below.

(1) The step of producing the above-mentioned optical waveguide section $W_1$ (with reference to FIGS. 4A to 4C, and FIGS. 5A to 5D).

(2) The step of producing the above-mentioned substrate section $E_1$ (with reference to FIGS. 7A to 7D).

(3) The step of coupling the above-mentioned substrate section $E_1$ to the above-mentioned optical waveguide section $W_1$.

The above-mentioned step (1) of producing the optical waveguide section $W_1$ will be described. First, a substrate 20 of a flat shape (with reference to FIG. 4A) for use in the formation of the under cladding layer 1 is prepared. Examples of a material for the formation of the substrate 20 include glass, quartz, silicon, resin, metal and the like. In particular, a stainless steel substrate is preferable. This is because the stainless steel substrate is excellent in resistance to thermal expansion and contraction so that various dimensions thereof are maintained substantially at their design values in the course of the manufacture of the above-mentioned optical waveguide section $W_1$. The thickness of the substrate 20 is, for example, in the range of 20 μm to 1 mm.

Figure 4A:
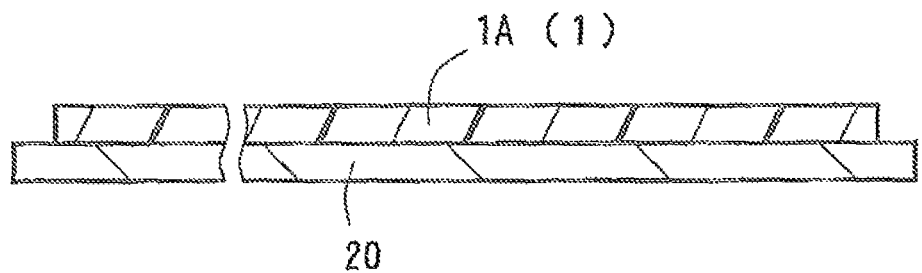
FIGS. 4A to 4C are illustrations schematically showing the steps of forming an under cladding layer and a core in an optical waveguide section of the above-mentioned optical sensor module.

Then, as shown in FIG. 4A, a varnish prepared by dissolving a photosensitive resin such as a photosensitive epoxy resin and the like for the formation of the under cladding layer in a solvent is applied to a predetermined region of the surface of the above-mentioned substrate 20. Thereafter, a heating treatment (at 50 to 120° C. for approximately 10 to 30 minutes) is performed on the varnish, as required, to dry the varnish, thereby forming a photosensitive resin layer 1A for the formation of the under cladding layer 1. Then, the photosensitive resin layer 1A is exposed to irradiation light such as ultraviolet light and the like. This causes the photosensitive resin layer 1A to be formed into the under cladding layer 1. The thickness of the under cladding layer 1 is typically in the range of 1 to 50 μm.

Figure 4B:
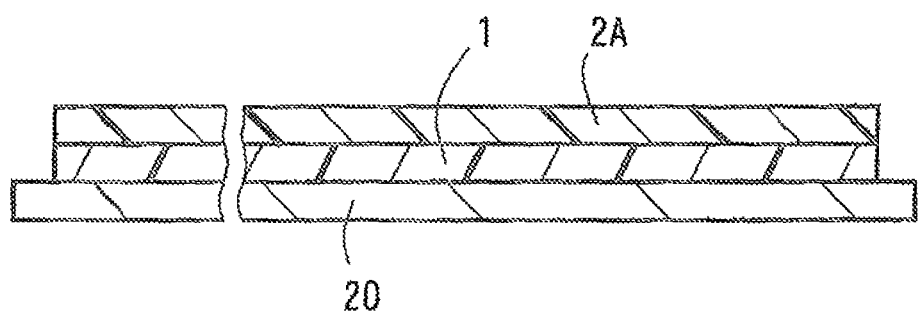
Figure 4C:
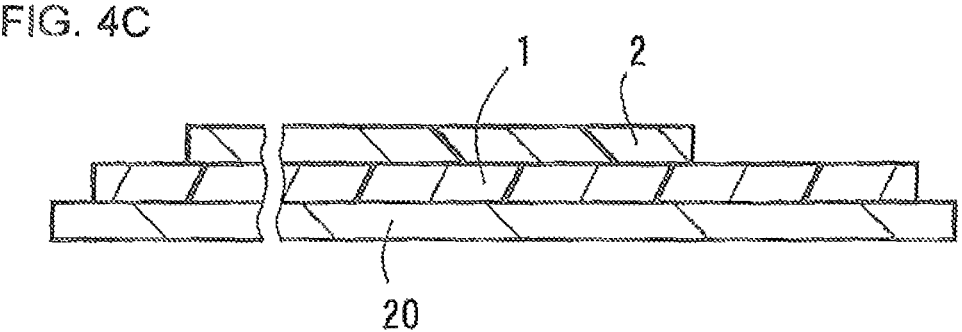

Next, as shown in FIG. 4B, a photosensitive resin layer 2A for the formation of the cores is formed on the surface of the above-mentioned under cladding layer 1 in a manner similar to the process for forming the above-mentioned photosensitive resin layer 1A for the formation of the under cladding layer. Then, the above-mentioned photosensitive resin layer 2A is exposed to irradiation light through a photomask formed with an opening pattern corresponding to the pattern of the cores 2. Next, a heating treatment is performed. Thereafter, development is performed using a developing solution to dissolve away unexposed portions of the above-mentioned photosensitive resin layer 2A, as shown in FIG. 4C, thereby forming the remaining photosensitive resin layer 2A into the pattern of the cores 2. The thickness (height) of the cores 2 is typically in the range of 5 to 60 μm. The width of the cores 2 is typically in the range of 5 to 60 μm.

Figure 5A:
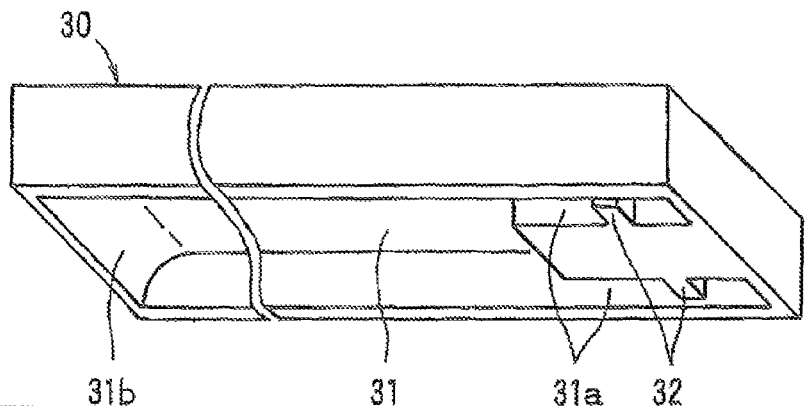
FIG. 5A is a perspective view schematically showing a molding die for use in the formation of an over cladding layer in the optical waveguide section.
Figure 5B:
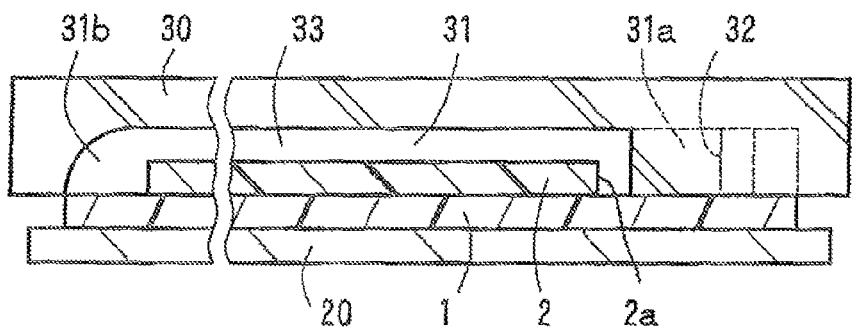
FIGS. 5B to 5D are illustrations schematically showing the steps of forming the over cladding layer.

A material for the formation of the above-mentioned cores 2 includes, for example, a photosensitive resin similar to that for the above-mentioned under cladding layer 1, and the material used herein has a refractive index greater than that of the material for the formation of the above-mentioned under cladding layer 1 and the over cladding layer 3 (with reference to FIG. 5B). The adjustment of this refractive index may be made, for example, by adjusting the selection of the types of the materials for the formation of the above-mentioned under cladding layer 1, the cores 2 and the over cladding layer 3, and the composition ratio thereof.

Next, a molding die 30 (with reference to FIG. 5A) is prepared. This molding die 30 is used to die-mold the over cladding layer 3 (with reference to FIG. 5C) and the extensions 4 of the over cladding layer 3 which have the groove portions 4a for the positioning of the substrate section (with reference to FIG. 5C) at the same time. The lower surface of this molding die 30 is formed with a recessed portion 31 having a die surface complementary in shape to the above-mentioned over cladding layer 3, as shown in FIG. 5A that is a perspective view as viewed from below. This recessed portion 31 includes portions 31a for the formation of the above-mentioned extensions 4, and a portion 31b for the formation of the lens portion 3b (with reference to FIG. 5C). Ridges 32 for the molding of portions of the groove portions 4a for the positioning of the above-mentioned substrate section which correspond to the over cladding layer 3 are formed in the portions 31a for the formation of the extensions. Also, the upper surface of the above-mentioned molding die 30 is formed with alignment marks (not shown) for the purpose of alignment with the first end surfaces 2a (the right-hand end surface as seen in FIG. 5B) of the cores 2 for the appropriate positioning of the molding die 30 when in use. The above-mentioned recessed portion 31 and the ridges 32 are formed in appropriate positions with respect to the alignment marks.

Thus, when the above-mentioned molding die 30 is set after the alignment marks of the above-mentioned molding die 30 are aligned with the first end surfaces 2a of the respective cores 2, and is used to perform the molding in that state, the over cladding layer 3 and the groove portions 4a for the positioning of the substrate section are die-molded at the same time in appropriate positions with respect to the first end surfaces 2a of the respective cores 2. Also, the above-mentioned molding die 30 is set by bringing the lower surface of the molding die 30 into intimate contact with the surface of the under cladding layer 1, whereby the space surrounded by the die surfaces of the above-mentioned recessed portion 31, the surface of the under cladding layer 1 and the surfaces of the cores 2 is defined as a mold space 33. Further, the above-mentioned molding die 30 is further formed with an inlet (not shown) for the injection of a resin for the formation of the over cladding layer therethrough into the above-mentioned mold space 33, the inlet being in communication with the above-mentioned recessed portion 31.

An example of the above-mentioned resin for the formation of the over cladding layer includes a photosensitive resin similar to that for the above-mentioned under cladding layer 1. In this case, it is necessary that the photosensitive resin that fills the above-mentioned mold space 33 be exposed to irradiation light such as ultraviolet light and the like directed through the above-mentioned molding die 30. For this reason, a molding die made of a material permeable to the irradiation light (for example, a molding die made of quartz) is used as the above-mentioned molding die 30. It should be noted that a thermosetting resin may be used as the resin for the formation of the over cladding layer. In this case, the above-mentioned molding die 30 may have any degree of transparency. For example, a molding die made of metal or quartz is used as the above-mentioned molding die 30.

Figure 5C:
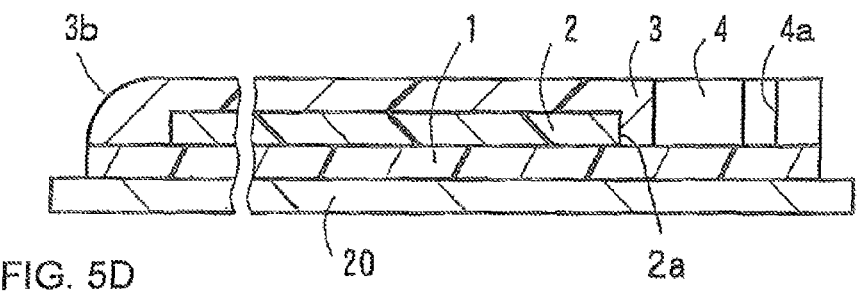

Then, as shown in FIG. 5B, the alignment marks of the above mentioned molding die 30 are aligned with the first end surfaces 2a of the above-mentioned cores 2 so that the entire molding die 30 is appropriately positioned. In this state, the lower surface of the molding die 30 is brought into intimate contact with the surface of the under cladding layer 1. Then, the resin for the formation of the over cladding layer is injected through the inlet formed in the above-mentioned molding die 30 into the mold space 33 surrounded by the die surfaces of the above-mentioned recessed portion 31 and the ridges 32, the surface of the under cladding layer 1 and the surfaces of the cores 2 to fill the above-mentioned mold space 33 therewith. Next, when the resin is the photosensitive resin, exposure to irradiation light such as ultraviolet light is performed through the above-mentioned molding die 30, and thereafter a heating treatment is performed. When the above-mentioned resin is the thermosetting resin, a heating treatment is performed. This hardens the above-mentioned resin for the formation of the over cladding layer to form the groove portions 4a for the positioning of the substrate section (the extensions 4 of the over cladding layer 3) at the same time as the over cladding layer 3. When the under cladding layer 1 and the over cladding layer 3 are made of the same material, the under cladding layer 1 and the over cladding layer 3 are integrated together at the contact portions thereof. Then, the molding die 30 is removed. As shown in FIG. 5C, the over cladding layer 3 and the portions of the groove portions 4a for the positioning of the substrate section which correspond to the over cladding layer 3 are provided. The portions of the groove portions 4a for the positioning of the substrate section are positioned in an appropriate location relative to the first end surfaces 2a of the cores 2 because these portions are formed with respect to the first end surfaces 2a of the cores 2 by using the above-mentioned molding die 30, as mentioned earlier. Also, the lens portion 3b of the above-mentioned over cladding layer 3 is also positioned in an appropriate location. Thus, the formation of the portions of the groove portions (fitting portions) 4a for the positioning of the substrate section in the appropriate position relative to the first end surfaces 2a of the cores 2 in the optical waveguide section $W_1$ is one of the striking characteristics of the present invention.

The thickness of the above-mentioned over cladding layer 3 (the thickness as measured from the surface of the under cladding layer 1) is typically in the range greater than the thickness of the cores 2 and not greater than 1200 μm. The size of the above-mentioned groove portions 4a for the positioning of the substrate section is defined in corresponding relation to the size of the fitting plate portions 5a of the substrate section $E_1$ for fitting engagement therewith. For example, the depth of the grooves is in the range of 0.2 to 1.2 mm, and the width of the grooves is in the range of 0.2 to 2.0 mm.

Figure 5D:
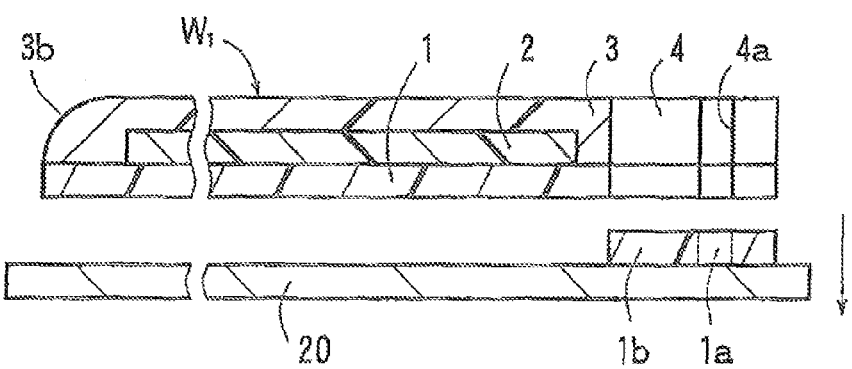

Then, as shown in FIG. 5D, the substrate 20 is stripped from the back surface of the under cladding layer (see the arrow shown). At this time, portions 1b of the under cladding layer 1 where the over cladding layer 3 is absent, such as portions 1a of the under cladding layer 1 corresponding to the above-mentioned groove portions 4a of the over cladding layer 3, have no adhesion to the over cladding layer 3, and hence are generally stripped off (together with the substrate 20) while adhering to the substrate 20. The remaining portion of the under cladding layer 1 is kept bonded to the over cladding layer 3, and separation occurs between the back surface of the under cladding layer 1 and the substrate 20. At this time, the portions 1a of the under cladding layer 1 corresponding to the above-mentioned groove portions 4a are stripped off and removed together with the above-mentioned substrate 20. Thus, the groove portions 4a for the positioning of the substrate section are formed to extend across the thickness of the under cladding layer 1 and the over cladding layer 3. This provides the optical waveguide section $W_1$ including the under cladding layer 1, the cores 2 and the over cladding layer 3, and formed with the groove portions 4a for the positioning of the above-mentioned substrate section. In this manner, the above-mentioned step (1) of producing the optical waveguide section $W_1$ is completed.

Figure 6:
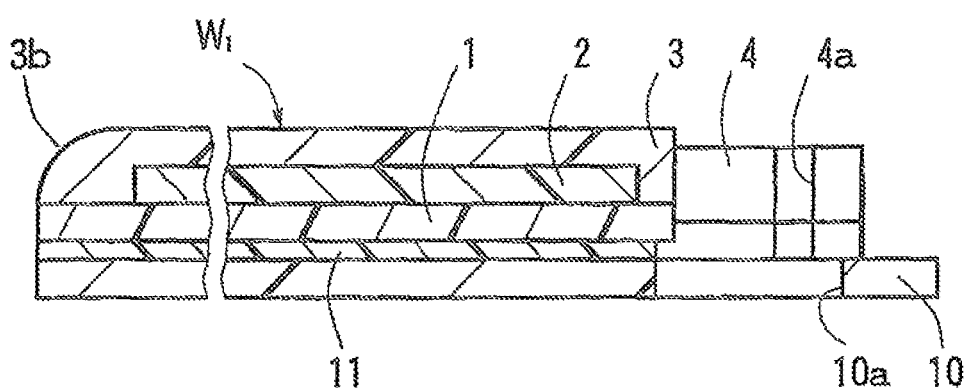
FIG. 6 is an illustration schematically showing the step of bonding the above-mentioned optical waveguide section to a base.

Then, as shown in FIG. 6, the above-mentioned optical waveguide section $W_1$ is bonded onto the base 10 that is an acrylic board or the like with the adhesive layer 11 therebetween. At this time, the under cladding layer 1 is bonded onto the base 10 with the adhesive layer 11. A base having no irregularities on the surface thereof is used as the above-mentioned base 10. The base 10 may be of any material, and may have any degree of transparency and any thickness. Examples of the base 10 include a polypropylene (PP) board, a metal plate, a ceramic sheet, and the like. The thickness of the above-mentioned base 10 is, for example, in the range of 500 μm to 5 mm.

Next, the above-mentioned step (2) of producing the substrate section $E_1$ will be described. First, a substrate 5A (with reference to FIG. 7A) serving as a base material of the above-mentioned shaping substrate 5 is prepared. Examples of a material for the formation of the substrate 5A include metal, resin and the like. In particular, a stainless steel substrate is preferable from the viewpoint of easy processibility and dimensional stability. The thickness of the above-mentioned substrate 5A is, for example, in the range of 0.02 to 0.1 mm.

Figure 7A:
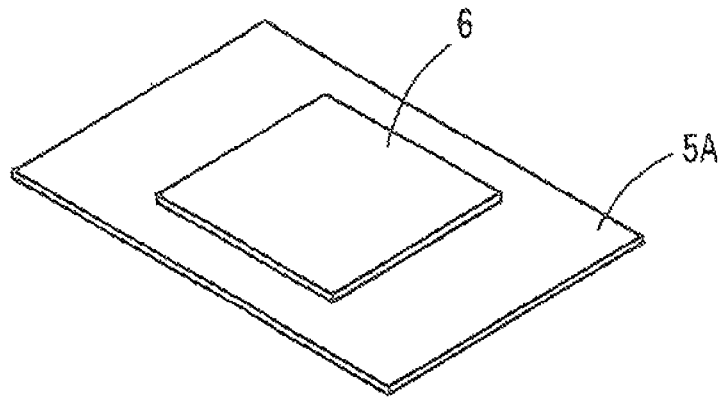
FIGS. 7A to 7D are illustrations schematically showing the steps of producing the above-mentioned substrate section.

Then, as shown in FIG. 7A, a varnish prepared by dissolving a photosensitive resin for the formation of the insulation layer such as a photosensitive polyimide resin and the like in a solvent is applied to a predetermined region of the surface of the above-mentioned substrate 5A. Thereafter, a heating treatment is performed on the varnish, as required, to dry the varnish, thereby forming a photosensitive resin layer for the formation of the insulation layer. Then, the photosensitive resin layer is exposed to irradiation light such as ultraviolet light and the like through a photomask. This causes the photosensitive resin layer to be formed into the insulation layer 6 having a predetermined shape. The thickness of the insulation layer 6 is typically in the range of 5 to 15 μm.

Figure 7B:
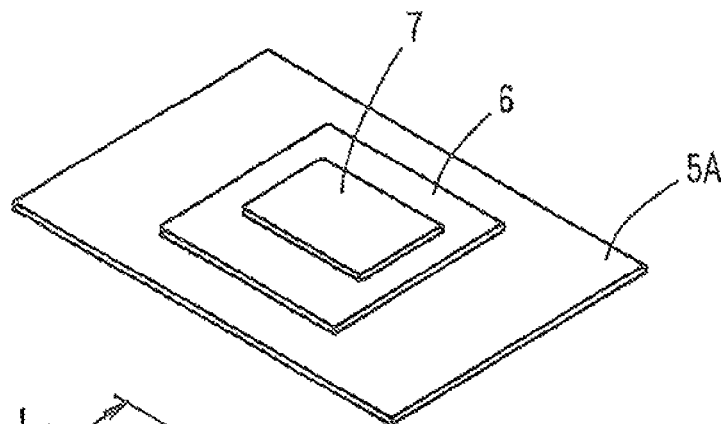

Next, as shown in FIG. 7B, the optical element mounting pad 7 and the electric circuit (not shown) for connection to the optical element mounting pad 7 are formed on the surface of the above-mentioned insulation layer 6. The formation of the mounting pad (including the electric circuit) 7 is achieved, for example, in a manner to be described below. Specifically, a metal layer (having a thickness on the order of 60 to 260 nm) is initially formed on the surface of the above-mentioned insulation layer 6 by sputtering, electroless plating or the like. This metal layer becomes a seed layer (a layer serving as a basis material for the formation of an electroplated layer) for a subsequent electroplating process. Then, a dry film resist is affixed to the opposite surfaces of a laminate comprised of the above-mentioned substrate 5A, the insulation layer 6, and the seed layer. Thereafter, a photolithographic process is performed to form hole portions having the pattern of the above-mentioned mounting pad 7 in the dry film resist on the side where the above-mentioned seed layer is formed, so that surface portions of the above-mentioned seed layer are uncovered at the bottoms of the hole portions. Next, electroplating is performed to form an electroplated layer (having a thickness on the order of 5 to 20 μm) in a stacked manner on the surface portions of the above-mentioned seed layer uncovered at the bottoms of the above-mentioned hole portions. Then, the above-mentioned dry film resist is stripped away using an aqueous sodium hydroxide solution and the like. Thereafter, a seed layer portion on which the above-mentioned electroplated layer is not formed is removed by soft etching, so that a laminate portion comprised of the remaining electroplated layer and the underlying seed layer is formed into the mounting pad (including the electric circuit) 7.

Figure 7C:
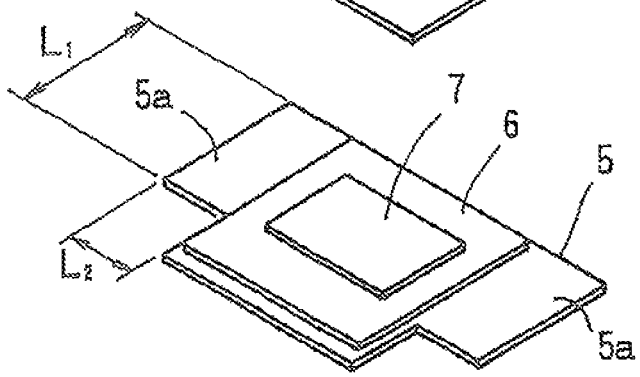

Then, as shown in FIG. 7C, the above-mentioned substrate 5A is formed into the shaping substrate 5 having the fitting plate portions 5a in the appropriate position relative to the mounting pad 7. The formation of the shaping substrate 5 is achieved, for example, in a manner to be described below. Specifically, the back surface of the above-mentioned substrate 5A is covered with a dry film resist. A photolithographic process is performed to leave portions of the dry film resist having an intended shape unremoved so that the fitting plate portions 5a are formed in the appropriate position relative to the mounting pad 7. Then, uncovered portions of the substrate 5A except where the portions of the dry film resist are left unremoved are etched away by using an aqueous ferric chloride solution. This causes the above-mentioned substrate 5A to be formed into the shaping substrate 5 having the fitting plate portions 5a. Then, the above-mentioned dry film resist is stripped away using an aqueous sodium hydroxide solution and the like. The size of the fitting plate portions 5a of the above-mentioned shaping substrate 5 is, for example, as follows: a vertical dimension $L_1$ in the range of 0.5 to 5.0 mm; and a horizontal dimension (protrusion length) $L_2$ in the range of 0.5 to 5.0 mm. Thus, the formation of the fitting plate portions (to-be-fitted portions) 5a in the appropriate position relative to the mounding pad 7 in the substrate section $E_1$ is one of the striking characteristics of the present invention.

Figure 7D:
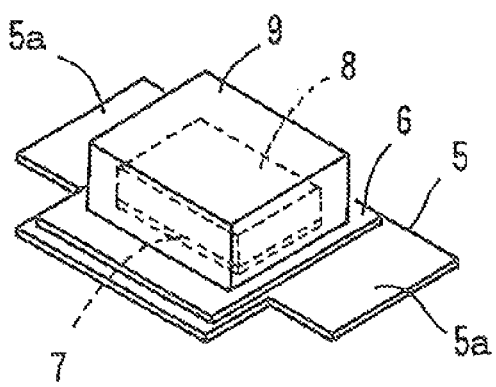

Then, as shown in FIG. 7D, the optical element 8 is mounted on the mounting pad 7, and thereafter the above-mentioned optical element 8 and its surrounding portion are sealed with a transparent resin by potting. The mounting of the above-mentioned optical element 8 is performed using a mounting machine after the optical element 8 is precisely positioned relative to the mounting pad 7 by using a positioning device such as a positioning camera and the like provided in the mounting machine. This provides the substrate section $E_1$ including the shaping substrate 5 having the fitting plate portions 5a, the insulation layer 6, the mounting pad 7, the optical element 8, and the transparent resin layer 9. In this manner, the above-mentioned step (2) of producing the substrate section $E_1$ is completed. In the substrate section $E_1$, the fitting plate portions 5a are formed with respect to the mounting pad 7, as mentioned earlier. Accordingly, the optical element 8 mounted on the mounting pad 7 and the fitting plate portions 5a are in an appropriate positional relationship.

Next, the above-mentioned step (3) of coupling the optical waveguide section $W_1$ and the substrate section $E_1$ together will be described. Specifically, the fitting plate portions 5a in the above-mentioned substrate section $E_1$ are brought into fitting engagement with the groove portions 4a in the optical waveguide section $W_1$ for the positioning of the substrate section so that the surface (the light-emitting portion or the light-receiving portion) of the optical element 8 of the substrate section $E_1$ (with reference to FIGS. 3 and 7D) faces toward the first end surfaces 2a of the cores 2 of the optical waveguide section $W_1$ (with reference to FIG. 6), whereby the above-mentioned optical waveguide section $W_1$ and the substrate section $E_1$ are integrated together (with reference to FIGS. 1A, 1B and 2). At this time, the lower edges of the fitting plate portions 5a are placed into abutment with the surface of the base 10. It should be noted that the fitting engagement portions of the above-mentioned groove portions 4a and the fitting plate portions 5a may be fixed with an adhesive. In this manner, the intended optical sensor module is completed.

In the above-mentioned optical waveguide section $W_1$, as mentioned earlier, the first end surfaces 2a of the cores 2 and the groove portions 4a for the positioning of the substrate section are in an appropriate positional relationship. In the substrate section $E_1$ with the above-mentioned optical element 8 mounted therein, the optical element 8 and the fitting plate portions 5a for fitting engagement with the above-mentioned groove portions 4a are also in an appropriate positional relationship. As a result, in the above-mentioned optical sensor module provided by bringing the above-mentioned fitting plate portions 5a into fitting engagement with the above-mentioned groove portions 4a, the first end surfaces 2a of the cores 2 and the optical element 8 are automatically placed in an appropriate positional relationship without any alignment operation. This enables the above-mentioned optical sensor module to achieve the appropriate propagation of light. Thus, bringing the fitting plate portions (to-be-fitted portions) 5a in the above-mentioned substrate section $E_1$ into fitting engagement with the groove portions (fitting portions) 4a in the optical waveguide section $W_1$ for the positioning of the substrate section to appropriately position the first end surfaces 2a of the cores 2 and the optical element 8 relative to each other is one of the striking characteristics of the present invention.

Figure 8:
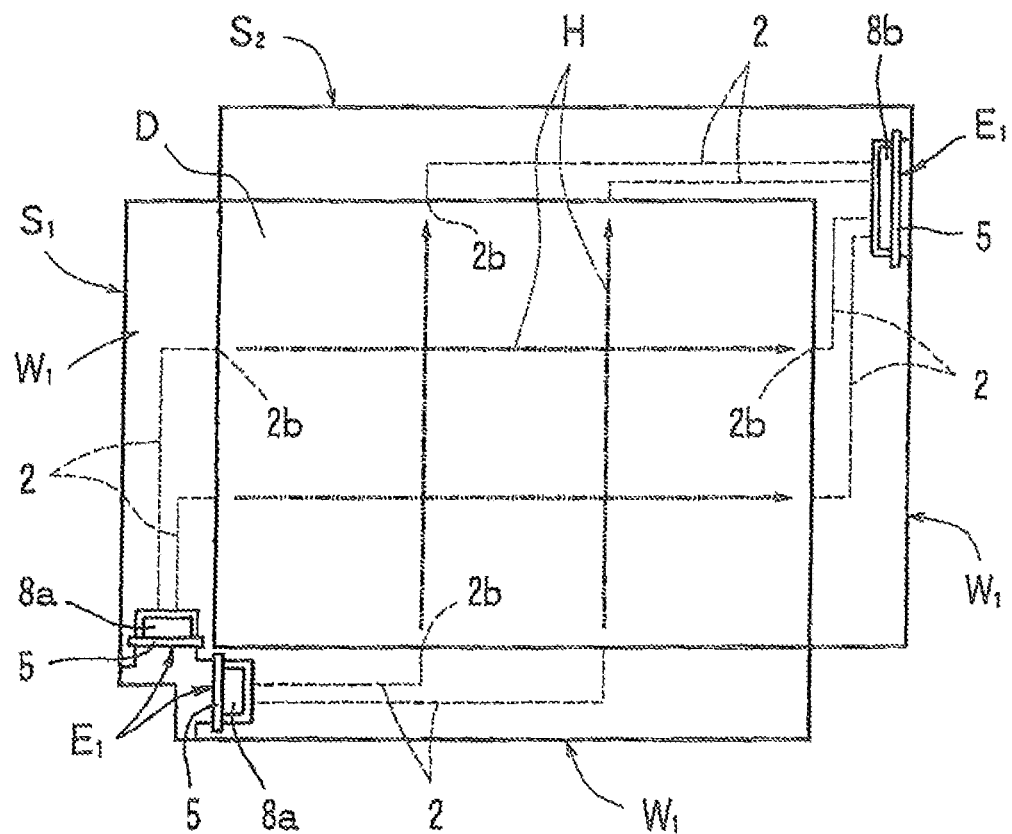
FIG. 8 is a plan view schematically showing a detection means for a touch panel using the above-mentioned optical sensor module.

The above-mentioned optical sensor module according to the present invention may be used as a detection means for detecting a finger touch position and the like on a touch panel. This is done, for example, by forming two L-shaped optical sensor modules $S_1$ and $S_2$ and using the two L-shaped optical sensor modules $S_1$ and $S_2$ arranged in the form of a rectangular frame, as shown in FIG. 8. The first L-shaped optical sensor module $S_1$ is configured such that two substrate sections $E_1$ with respective light-emitting elements 8a mounted therein are in fitting engagement with a corner portion thereof, and such that the second end surfaces 2b of the cores 2 and the lens surface of the over cladding layer 3 from which light beams H are emitted face toward the inside of the above-mentioned frame. The second L-shaped optical sensor module $S_2$ is configured such that a single substrate sections $E_1$ with a light-receiving elements 8b mounted therein is in fitting engagement with a corner portion thereof, and such that the lens surface of the over cladding layer 3 and the second end surfaces 2b of the cores 2 which receive the light beams H face toward the inside of the above-mentioned frame. The above-mentioned two L-shaped optical sensor modules $S_1$ and $S_2$ are arranged along the rectangle of the periphery of a display screen of a rectangular display D of the touch panel so as to surround the display screen, so that the light beams H emitted from the first L-shaped optical sensor module $S_1$ are received by the second L-shaped optical sensor module $S_2$. This allows the above-mentioned emitted light beams H to travel in parallel with the display screen and in a lattice form on the display screen of the display D. When a portion of the display screen of the display D is touched with a finger, the finger blocks some of the emitted light beams H. Thus, the light-receiving element 8b senses a light blocked portion, whereby the position of the above-mentioned portion touched with the finger is detected. In FIG. 8, the cores 2 are indicated by broken lines, and the thickness of the broken lines indicates the thickness of the cores 2. Also, the number of cores 2 is shown as abbreviated.

Figure 9A:
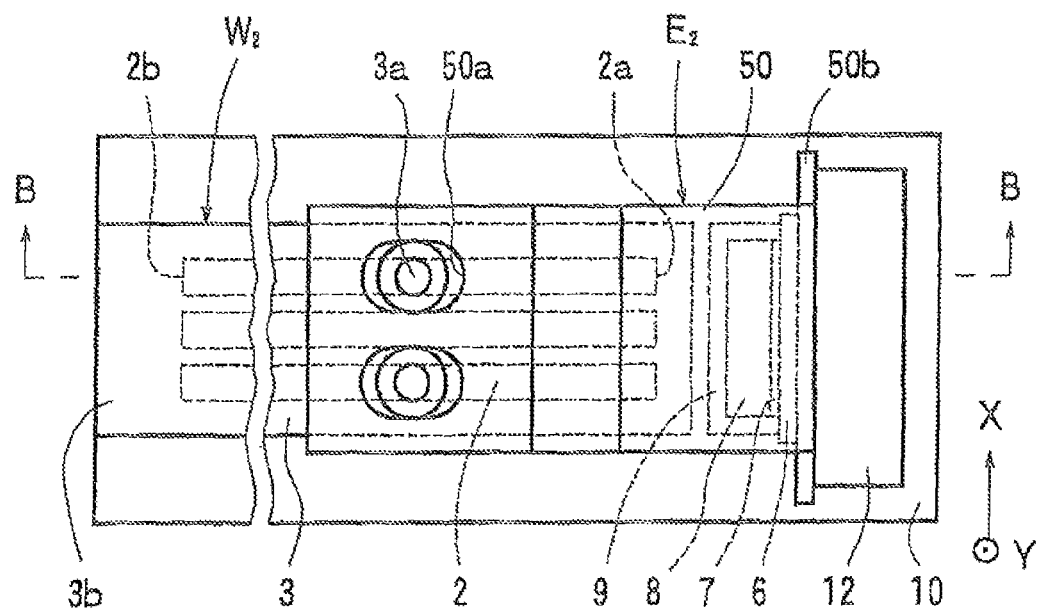
FIG. 9A is a plan view schematically showing an optical sensor module according to a second preferred embodiment of the present invention.
Figure 9B:
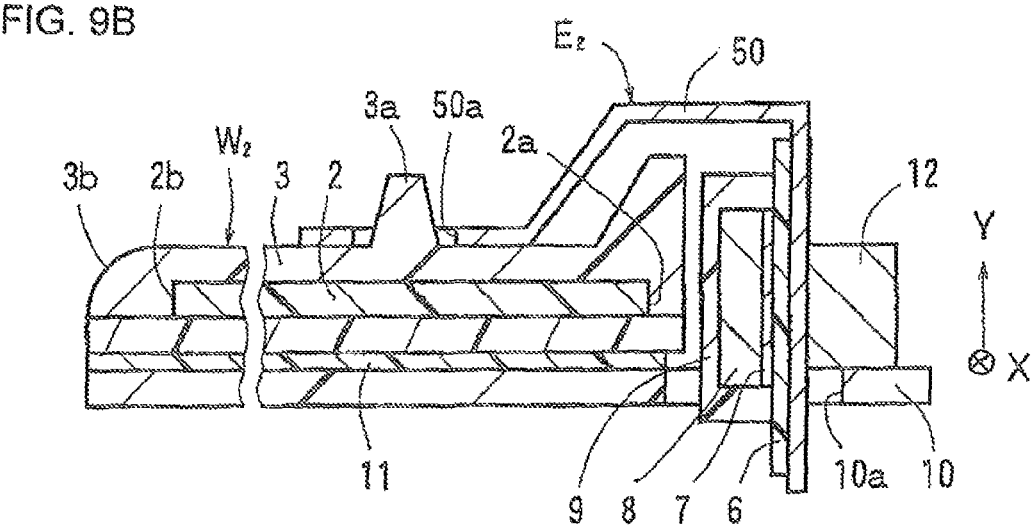
FIG. 9B is a sectional view taken along the line B-B of FIG. 9A.
Figure 10:
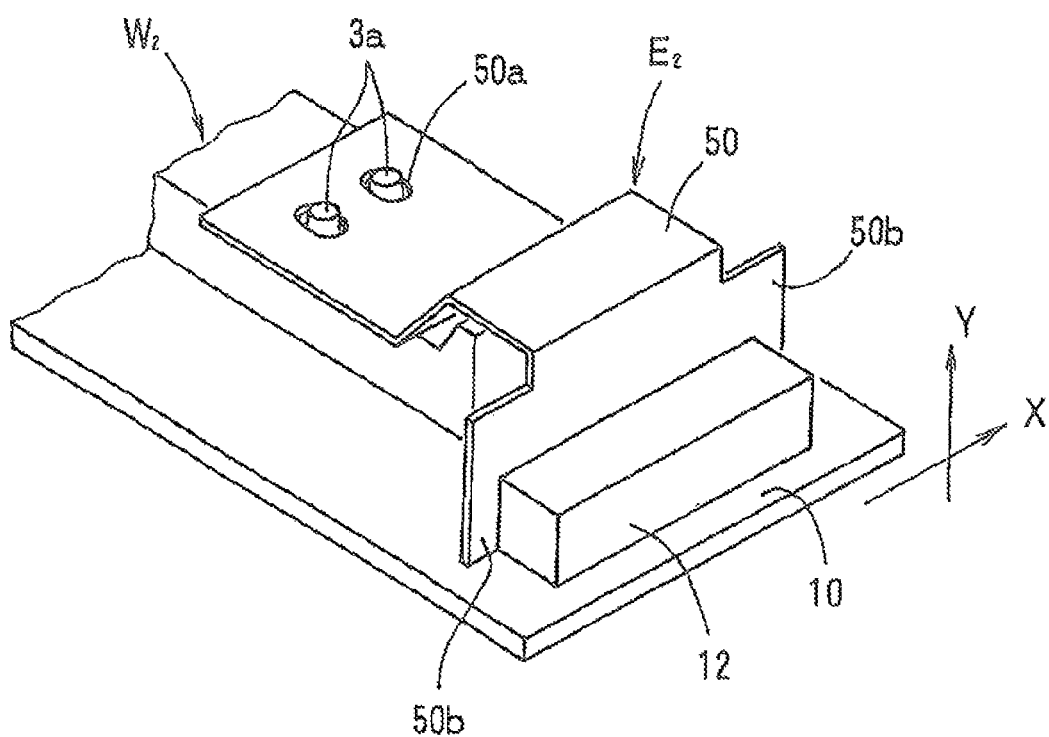
FIG. 10 is a perspective view schematically showing one end portion of the above-mentioned optical sensor module.

FIG. 9A is a plan view schematically showing an optical sensor module according to a second embodiment of the present invention, and FIG. 9B is a sectional view taken along the line B-B of FIG. 9A. FIG. 10 is a perspective view showing a first end portion (the right-hand end portion as seen in FIGS. 9A and 9B) of the optical sensor module as seen diagonally from the upper right. This optical sensor module is constructed by: individually producing an optical waveguide section $W_2$ including protruding portions (fitting portions) 3a for the positioning of a substrate section, and a substrate section $E_2$ including through hole portions (to-be-fitted portions) 50a for fitting engagement with the protruding portions 3a; and then bringing the above-mentioned through hole portions 50a in the substrate section $E_2$ into fitting engagement with the above-mentioned protruding portions 3a in the above-mentioned optical waveguide section $W_2$ to integrate the substrate section $E_2$ and the optical waveguide section $W_2$ together. In the optical waveguide section $W_2$, the above-mentioned protruding portions 3a are formed in an appropriate position relative to the first end surfaces 2a of the respective cores 2. The optical element 8 is mounted in the substrate section $E_2$, and the above-mentioned through hole portions 50a having an appropriate shape are formed in an appropriate position relative to the optical element 8. Thus, the first end surfaces 2a of the respective cores 2 and the optical element 8 are appropriately positioned and in alignment with each other by the fitting engagement between the above-mentioned protruding portions 3a and the through hole portions 50a. In the optical waveguide section $W_2$ according to this embodiment, the first end portion (the right-hand end portion as seen in FIG. 9B) of the over cladding layer 3 is thick. The remaining parts of the second embodiment are similar to those of the first embodiment described above. Like reference numerals and characters are used to designate similar parts.

Specifically, in the above-mentioned optical waveguide section $W_2$, the two protruding portions 3a serving as the fitting portions for the positioning of the substrate section are provided on the upper surface of the over cladding layer 3 and are arranged in a direction in which the cores 2 are arranged (along the X-axis) while being appropriately positioned relative to the first end surfaces 2a of the cores 2.

Figure 11:
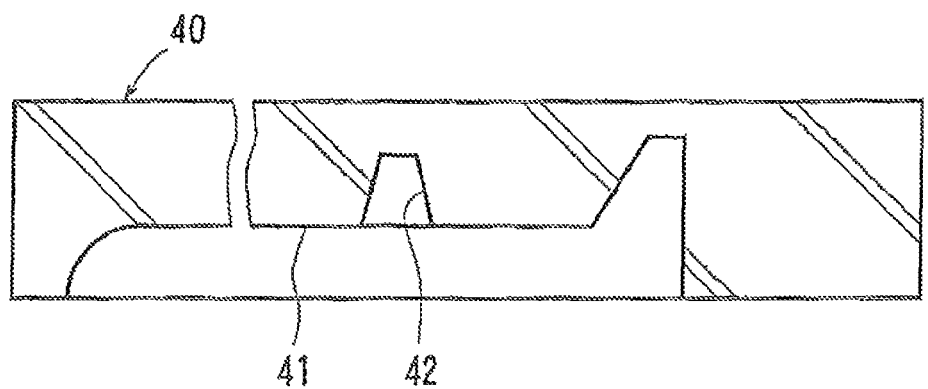
FIG. 11 is a sectional view schematically showing a molding die for use in the formation of the over cladding layer in the above-mentioned optical waveguide section.

The above-mentioned optical waveguide section $W_2$ is produced using a molding die 40 for the formation of the over cladding layer in the step of forming the over cladding layer, the molding die 40 being configured such that indentations 42 complementary in shape to the above-mentioned protruding portions 3a are formed in a recessed portion 41 having a die surface complementary in shape to the over cladding layer 3, as shown in FIG. 11 that is a sectional view of the molding die 40. The remaining steps for the production of the optical waveguide section $W_2$ in the second embodiment are similar to those for the production of the optical waveguide section $W_1$ in the first embodiment described above.

Figure 12:
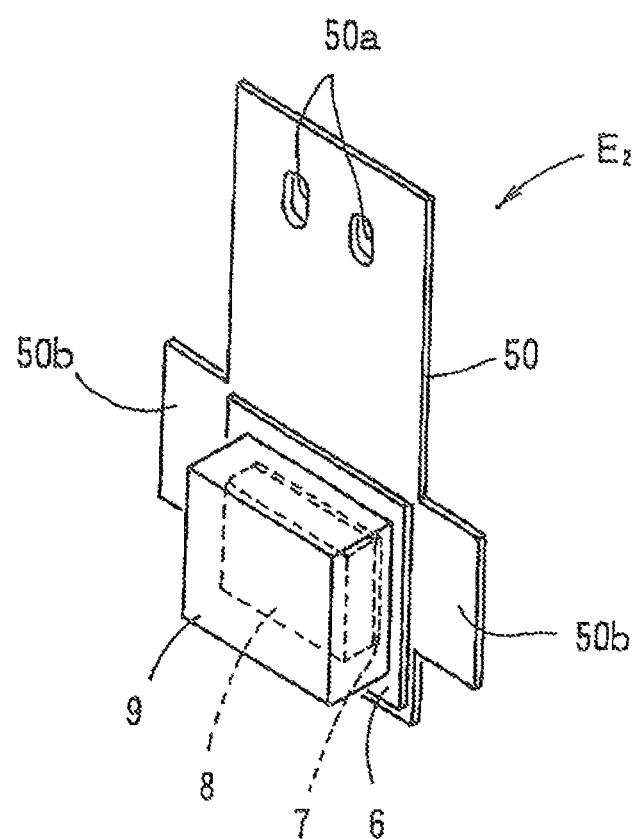
FIG. 12 is a perspective view schematically showing the substrate section of the above-mentioned optical sensor module.
Figure 13A:
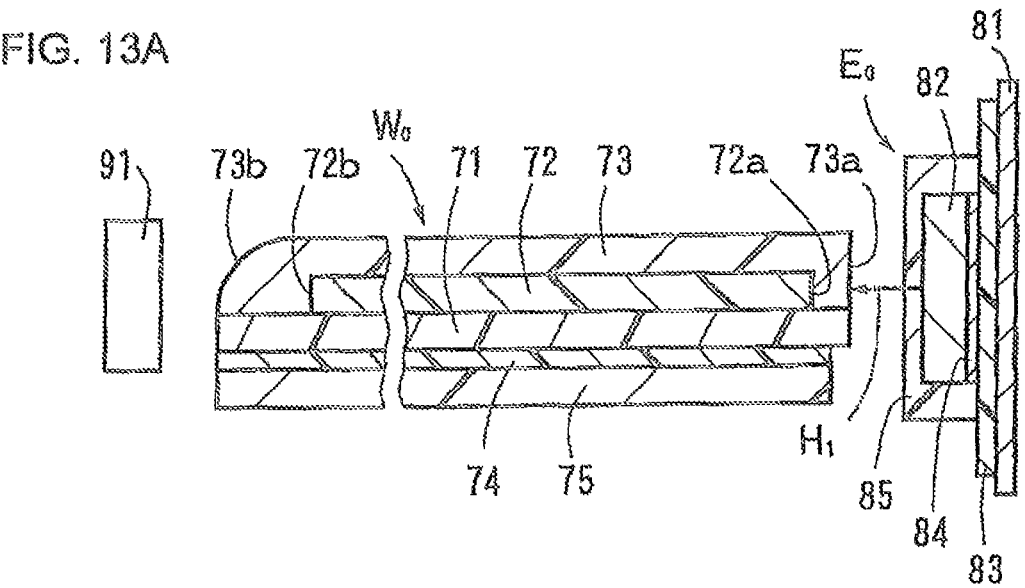
FIGS. 13A and 13B are illustrations schematically showing a conventional method of alignment in an optical sensor module.
Figure 13B:
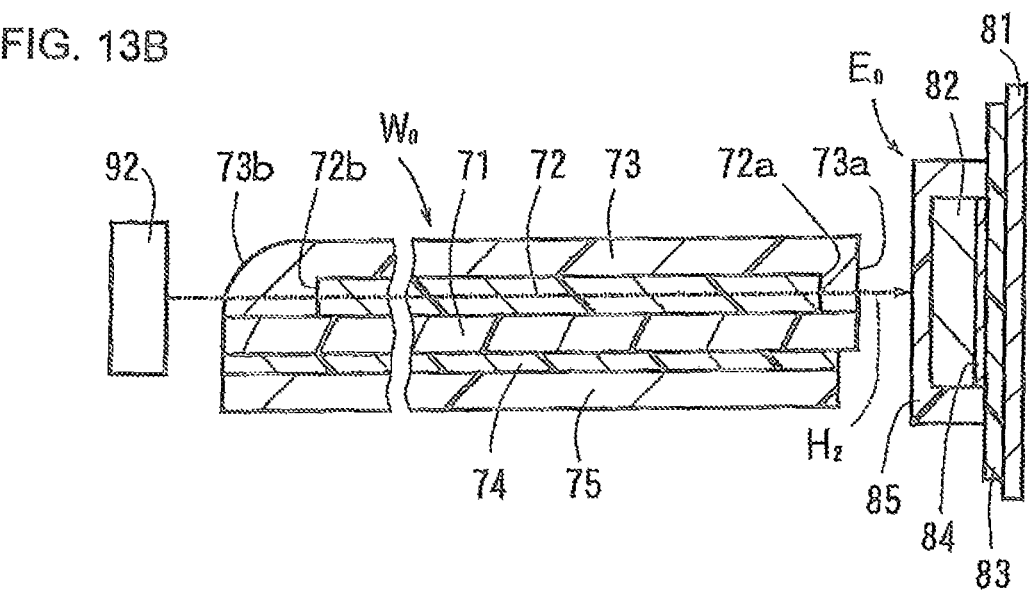

The above-mentioned substrate section $E_2$ employs a shaping substrate 50 including the two through hole portions 50a for fitting engagement with the above-mentioned protruding portions 3a, and abutment plate portions 50b protruding both leftwardly and rightwardly in cross direction as seen in the Figure for abutment with the surface of the above-mentioned base 10, as shown in FIG. 12 that is a perspective view of the substrate section $E_2$. The through hole portions 50a and the rectangular abutment plate portions 50b protruding leftwardly and rightwardly in cross direction as seen in the Figure in the above-mentioned shaping substrate 50 are formed by etching, and are appropriately positioned and shaped relative to the above-mentioned optical element mounting pad 7.

The above-mentioned substrate section $E_2$ is produced by leaving portions of the dry film resist of an intended shape by a photolithographic process, and then etching away the uncovered portions of the substrate 5A except where the portions of the dry film resist are left (with reference to FIG. 7C) in a manner similar to the production of the substrate section $E_1$ of the first embodiment described above, so that the through hole portions 50a and the abutment plate portions 50b are formed in appropriate positions relative to the mounting pads 7 in the step of forming the shaping substrate 50 by etching. The remaining steps for the production of the substrate section $E_2$ in the second embodiment are similar to those for the production of the substrate section $E_1$ in the first embodiment described above. It should be noted that the inside diameter of the through hole portions 50a is slightly greater than the outside diameter of the protruding portions 3a.

The process of coupling the optical waveguide section $W_2$ and the substrate section $E_2$ together to form the optical sensor module is performed by bringing the through hole portions 50a in the substrate section $E_2$ into fitting engagement with the protruding portions 3a in the optical waveguide section $W_2$ (the positioning along the X-axis) so that the surface (the light-emitting portion or the light-receiving portion) of the optical element 8 of the substrate section $E_2$ is opposed to the first end surfaces 2a of the cores 2, and also by placing the lower edges of the abutment plate portions 50b of the substrate section $E_2$ into abutment with the surface of the base 10 (the positioning along the Y-axis). At this time, the substrate section $E_2$ is bent, as appropriate, and an outside portion of the substrate section $E_2$ is fixed on the surface of the base 10 with a fixing member 12 such as an adhesive, a protrusion and the like. When the substrate section $E_2$ is bent in this manner, the flexure of the substrate section $E_2$ accommodates variations in precision.

In the optical sensor module according to the second embodiment, the protruding portions 3a in the optical waveguide section $W_2$ is preferably formed in a frusto-conical shape. The formation of the protruding portions 3a in a frusto-conical shape allows the above-mentioned protruding portions 3a and the through hole portions 50a to come into coaxially fitting engagement with each other even if the outside diameter of the above-mentioned protruding portions 3a and the inside diameter of the above-mentioned through hole portions 50a deviate from their design values during the fitting engagement of the through hole portions 50a in the substrate section $E_2$ with the protruding portions 3a. This prevents misregistration between the optical waveguide section $W_2$ and the substrate section $E_2$ along a plane perpendicular to the axes thereof. When the protruding portions 3a have a frusto-conical shape, the size of the protruding portions 3a is as follows: a height of 500 to 1200 μm, a lower base with a diameter of 800 to 3000 μm, and an upper base with a diameter of 500 to 2000 μm.

Also, the above-mentioned through hole portions 50a in the substrate section $E_2$ are preferably in the form of slots extending in a direction perpendicular to a direction in which the through hole portions 50a are arranged. When the through hole portions 50a are in the form of slots, the slots accommodate variations in precision in the longitudinal direction thereof.

For the die-molding of the over cladding layer (including the groove portions 4a and the protruding portions 3a) 3 in the above-mentioned embodiments, the molding die 30 is set, and thereafter the resin is injected into the mold space 33. Instead, the die-molding may be accomplished by press molding using the above-mentioned molding die 30. Specifically, a resin layer is formed in a region where the over cladding layer 3 is to be formed so as to cover the cores 2. The above-mentioned molding die 30 is pressed against the resin layer. In that state, exposure to irradiation light and a heating treatment may be performed through the above-mentioned molding die 30.

In the above-mentioned embodiments, the insulation layer 6 is formed for the production of the substrate sections $E_1$ and $E_2$. This insulation layer 6 is provided for the purpose of preventing a short circuit from occurring between the substrate 5A having electrical conductivity such as a metal substrate and the mounting pad 7. For this reason, when the substrate 5A has insulating properties, the mounting pad 7 may be formed directly on the above-mentioned substrate 5A without the formation of the insulation layer 6.

In the above-mentioned embodiments, the second end portion (the left-hand end portion as seen in the FIGS. 1B and 9B) of the over cladding layer 3 is formed as the lens portion 3b. Instead, the second end portion of the over cladding layer 3 may be formed in a planar configuration, rather than as the lens portions 3b, depending on the application of the optical sensor module.

Next, examples of the present invention will be described. It should be noted that the present invention is not limited to the examples.

EXAMPLES

Material for Formation of Under Cladding Layer and Over Cladding Layer (Including Extensions and Protruding Portions)

A material for the formation of an under cladding layer and an over cladding layer was prepared by mixing 35 parts by weight of bisphenoxyethanolfluorene diglycidyl ether (component A), 40 parts by weight of 3',4'-epoxycyclohexyl methyl-3,4-epoxycyclohexane carboxylate which is an alicyclic epoxy resin (CELLOXIDE 2021P manufactured by Daicel Chemical Industries, Ltd.) (component B), 25 parts by weight of (3'4'-epoxycyclohexane)methyl-3',4'-epoxycyclohexyl-carboxylate (CELLOXIDE 2081 manufactured by Daicel Chemical Industries, Ltd.) (component C), and 2 parts by weight of a 50% by weight propione carbonate solution of 4,4'-bis[di(β-hydroxyethoxy)phenylsulfinio]phenyl-sulfide-bis-hexafluoroantimonate (component D).

Material for Formation of Cores

A material for the formation of cores was prepared by dissolving 70 parts by weight of the aforementioned component A, 30 parts by weight of 1,3,3-tris{4-[2-(3-oxetanyl)]butoxyphenyl}butane and one part by weight of the aforementioned component D in ethyl lactate.

Example 1

Production of Optical Waveguide Section

The material for the formation of the above-mentioned under cladding layer was applied to a surface of a stainless steel substrate with an applicator. Thereafter, exposure by the use of irradiation with ultraviolet light (having a wavelength of 365 nm) at 2000 mJ/cm$^2$ was performed, to thereby form the under cladding layer (having a thickness of 25 μm) (with reference to FIG. 4A).

Then, the material for the formation of the above-mentioned cores was applied to a surface of the above-mentioned under cladding layer with an applicator. Thereafter, a drying process was performed at 100° C. for 15 minutes to form a photosensitive resin layer (with reference to FIG. 4B). Next, a synthetic quartz chrome mask (photomask) formed with an opening pattern identical in shape with the pattern of the cores was placed over the photosensitive resin layer. Then, exposure by the use of irradiation with ultraviolet light (having a wavelength of 365 nm) at 4000 mJ/cm$^2$ was performed by a proximity exposure method from over the mask. Thereafter, a heating treatment was performed at 80° C. for 15 minutes. Next, development was carried out using an aqueous solution of γ-butyrolactone to dissolve away unexposed portions. Thereafter, a heating treatment was performed at 120° C. for 30 minutes to form the cores (having a thickness of 50 μm and a width of 50 μm) (with reference to FIG. 4C).

Next, a molding die made of quartz (with reference to FIG. 5A) for the die-molding of the over cladding layer and groove portions for the positioning of a substrate section (the extensions of the over cladding layer) at the same time was set in an appropriate position by using first end surfaces of the respective cores as a reference (with reference to FIG. 5B). Then, the material for the formation of the above-mentioned over cladding layer and the extensions thereof was injected into a mold space. Thereafter, exposure by the use of irradiation with ultraviolet light at 2000 mJ/cm$^2$ was performed through the molding die. Subsequently, a heating treatment was performed at 120° C. for 15 minutes. Thereafter, the die was removed. This provided the over cladding layer, and the groove portions for the positioning of the substrate section (with reference to FIG. 5C). The thickness of the above-mentioned over cladding layer (the thickness as measured from the surface of the under cladding layer) was 1000 μm when measured with a contact-type film thickness meter.

Then, the stainless steel substrate was stripped from the back surface of the under cladding layer (with reference to FIG. 5D). At this time, portions of the under cladding layer where the over cladding layer was absent, included in portions of the under cladding layer corresponding to the above-mentioned groove portions of the over cladding layer were stripped off while adhering to the stainless steel substrate (together with the stainless steel substrate). As a result, the groove portions were formed to extend across the thickness of the under cladding layer and the over cladding layer. Then, the stripped optical waveguide section was bonded onto an acrylic board with an adhesive (with reference to FIG. 6). The above-mentioned groove portions had the following dimensions: a depth of 1.0 mm, a width of 0.3 mm, and a distance of 14.0 mm between the bottom surfaces of opposed groove portions.

Production of Substrate Section

An insulation layer (having a thickness of 10 μm) made of a photosensitive polyimide resin was formed on a portion of the surface of a stainless steel substrate [25 mm×30 mm×35 μm (thick)] (with reference to FIG. 7A). Then, a semi-additive process was performed to form an optical element mounting pad (including an electric circuit) on a surface of the above-mentioned insulation layer, the optical element mounting pad being formed by lamination of a seed layer made of copper/nickel/chromium alloy, and an electro copper plated layer (having a thickness of 10 μm) (with reference to FIG. 7B).

Next, etching was performed using a dry film resist so that fitting plate portions were formed in an appropriate position relative to the above-mentioned optical element mounting pad. This caused the stainless steel substrate portion to be formed into a shaping substrate having the fitting plate portions. Thereafter, the above-mentioned dry film resist was stripped away using an aqueous sodium hydroxide solution (with reference to FIG. 7C).

A silver paste was applied to the surface of the above-mentioned optical element mounting pad. Thereafter, a high-precision die bonder (mounting apparatus) was used to mount a light-emitting element of a wire bonding type (SM85-1N001 manufactured by Optowell Co., Ltd.) onto the above-mentioned silver paste. Thereafter, a curing process was performed to harden the above-mentioned silver paste. Thereafter, the above-mentioned light-emitting element and its surrounding portion were sealed with a transparent resin (NT-8038 manufactured by Nitto Denko Corporation) by potting (with reference to FIG. 7D). In this manner, the substrate section was produced. The fitting plate portions of the substrate section had the following dimensions: a vertical dimension of 2.0 mm, a horizontal dimension (protrusion length) of 2.0 mm, and a total width of 14.0 mm.

Manufacture of Optical Sensor Module

The fitting plate portions in the above-mentioned substrate section were brought into fitting engagement with the groove portions in the above-mentioned optical waveguide section for the positioning of the substrate section, and the lower edges of the fitting plate portions were placed into abutment with the surface of the acrylic board. Thereafter, the fitting engagement portions of the fitting plate portions and the groove portions were fixed with an adhesive. In this manner, an optical sensor module was manufactured (with reference to FIGS. 1A, 1B and 2).

Example 2

The optical waveguide section and the substrate section in Example 1 described above were produced in a manner to be described below. Except for this, an optical sensor module in Example 2 was manufactured in a manner similar to that in Example 1 described above.

Production of Optical Waveguide Section

The molding die for the formation of the over cladding layer was changed in the step of forming the over cladding layer. This produced an optical waveguide section in which two protruding portions formed in a frusto-conical shape for the positioning of the substrate section were provided on the upper surface of the over cladding layer and were arranged in a direction in which the cores were arranged while being appropriately positioned relative to the first end surfaces of the cores. The above-mentioned protruding portions of the frusto-conical shape had the following dimensions: a height of 0.8 mm, a lower base diameter of 1.4 mm, an upper base diameter of 2.0 mm, and a center-to-center distance of 5.0 mm between the two protruding portions.

Production of Substrate Section

The shape of the dry film resist was changed in the step of forming the shaping substrate by etching. This produced the shaping substrate in which rectangular abutment plate portions for abutment with the surface of the above-mentioned acrylic board protruded on opposite sides in an appropriate position relative to the optical element mounting pad and in which two through hole portions for fitting engagement with the protruding portions were formed (with reference to FIG. 12). The above-mentioned abutment plate portions had the following dimensions: a vertical dimension of 2.0 mm, a horizontal dimension (protrusion length) of 2.0 mm, and a total width of 14.0 mm. The above-mentioned through hole portions were in the form of slots having the following dimensions: an arcuate portion radius of 0.95 mm, a width of 1.90 mm, a length of 3.9 mm, and a center-to-center distance of 5.0 mm between the two slots.

Manufacture of Optical Sensor Module

The through hole portions in the above-mentioned substrate section were brought into fitting engagement with the protruding portions in the above-mentioned optical waveguide section for the positioning of the substrate section, and the lower edges of the abutment plate portions were placed into abutment with the surface of the acrylic board. Thereafter, the abutting portions of the abutment plate portions were fixed with an adhesive. In this manner, an optical sensor module was manufactured (with reference to FIGS. 9A, 9B and 10).

Light Propagation Test

Current was fed through the light-emitting element of the optical sensor module in Examples 1 and 2 described above to cause the light-emitting element to emit light. Then, the emission of light from an end portion of the optical sensor module was seen.

This result shows that the above-mentioned manufacturing method allows the optical sensor module obtained thereby to propagate light appropriately without any alignment operation of the cores of the optical waveguide section and the light-emitting element of the substrate section.

The optical sensor module according to the present invention may be used for a detection means for detecting a finger touch position and the like on a touch panel, or information communications equipment and signal processors for transmitting and processing digital signals representing sound, images and the like at high speeds.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. A method of manufacturing an optical sensor module, comprising the steps of:
   (a) producing an optical waveguide section;
   (b) producing a substrate section; and
   (c) coupling the optical waveguide section and the substrate section together,
   said step (a) including the steps of (a-1) forming a linear core for an optical path on a surface of an under cladding layer, and
(a-2) then performing a die-molding process to form an over cladding layer for covering the core and at the same time to form groove portions for the positioning of the substrate section in an extended portion of the over cladding layer lying in an appropriate position relative to an end portion of the core and where the core is absent,
said step (b) including the steps of
(b-1) placing an optical element mounting pad on a substrate,
(b-2) forming plate portions for fitting engagement with the groove portions in an appropriate position of the substrate relative to the optical element mounting pad, and
(b-3) mounting an optical element on the optical element mounting pad,
said step (c) including the step of
(c-1) bringing the plate portions in the substrate section into fitting engagement with the groove portions in the optical waveguide section to integrate the optical waveguide section and the substrate section together.

2. A method of manufacturing an optical sensor module, comprising the steps of:
(a) producing an optical waveguide section;
(b) producing a substrate section; and
(c) coupling the optical waveguide section and the substrate section together,
said step (a) including the steps of
(a-1) forming a linear core for an optical path on a surface of an under cladding layer, and
(a-2) then performing a die-molding process to form an over cladding layer for covering the core and at the same time to form protruding portions for the positioning of the substrate section on the upper surface of the over cladding layer lying in an appropriate position relative to an end portion of the core,
said step (b) including the steps of
(b-1) placing an optical element mounting pad on a substrate,
(b-2) forming through hole portions for fitting engagement with the protruding portions in an appropriate position of the substrate relative to the optical element mounting pad, and
(b-3) mounting an optical element on the optical element mounting pad,
said step (c) including the step of
(c-1) bringing the through hole portions in the substrate section into fitting engagement with the protruding portions in the optical waveguide section and bending the substrate section as appropriate to integrate the optical waveguide section and the substrate section together.

3. An optical sensor module comprising:
an optical waveguide section; and
a substrate section with an optical element mounted therein,
said optical waveguide section and said substrate section being coupled to each other,
said optical waveguide section including an under cladding layer, a linear core for an optical path and formed on a surface of the under cladding layer, an over cladding layer for covering the core, and groove portions for the positioning of the substrate section and formed in an extended portion of the over cladding layer where the core is absent,
said substrate section including a substrate having plate portions for fitting engagement with the groove portions for the positioning of the substrate section, an optical element mounting pad placed in a portion on the substrate except where the plate portions are formed, and the optical element mounted on the optical element mounting pad,
the coupling between said optical waveguide section and said substrate section being provided, with said plate portions in said substrate section held in fitting engagement with said groove portions in said optical waveguide section.

4. An optical sensor module,
comprising:
an optical waveguide section; and
a substrate section with an optical element mounted therein,
said optical waveguide section and said substrate section being coupled to each other,
said optical waveguide section including an under cladding layer, a linear core for an optical path and formed on a surface of the under cladding layer, an over cladding layer for covering the core, and protruding portions for the positioning of the substrate section and formed on the upper surface of the over cladding layer,
said substrate section including a substrate having through hole portions for fitting engagement with the protruding portions, an optical element mounting pad placed in a portion on the substrate except where the through hole portions are formed, and the optical element mounted on the optical element mounting pad,
the coupling between said optical waveguide section and said substrate section being provided, with said through hole portions in said substrate section held in fitting engagement with said protruding portions in said optical waveguide section and with the substrate section bended as appropriate.

* * * * *